United States Patent
Jakobsson et al.

(10) Patent No.: US 12,494,591 B2
(45) Date of Patent: Dec. 9, 2025

(54) MRC COMBINED DISTRIBUTED PHASED ANTENNA ARRAYS

(71) Applicant: Telefonaktiebolaget LM Ericsson (publ), Stockholm (SE)

(72) Inventors: Peter Jakobsson, Lund (SE); Magnus Nilsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 17/784,394

(22) PCT Filed: Dec. 20, 2019

(86) PCT No.: PCT/EP2019/086828
§ 371 (c)(1),
(2) Date: Jun. 10, 2022

(87) PCT Pub. No.: WO2021/121634
PCT Pub. Date: Jun. 24, 2021

(65) Prior Publication Data
US 2022/0416447 A1    Dec. 29, 2022

(51) Int. Cl.
*H01Q 21/29*    (2006.01)
*H04B 7/0408*    (2017.01)
*H04B 7/06*    (2006.01)

(52) U.S. Cl.
CPC .......... *H01Q 21/29* (2013.01); *H04B 7/0408* (2013.01); *H04B 7/0617* (2013.01)

(58) Field of Classification Search
CPC ..... H01Q 21/29; H04B 7/0408; H04B 7/0617
See application file for complete search history.

(56) References Cited

U.S. PATENT DOCUMENTS

| | | | | |
|---|---|---|---|---|
| 5,999,826 A * | 12/1999 | Whinnett | ............. | H01Q 3/2605 455/69 |
| 6,167,286 A * | 12/2000 | Ward | ................... | H04B 7/0491 455/562.1 |
| 6,463,303 B1 * | 10/2002 | Zhao | ................... | H04B 7/0695 342/368 |

(Continued)

FOREIGN PATENT DOCUMENTS

EP    0807989 A1    6/2001

*Primary Examiner* — Dimary S Lopez Cruz
*Assistant Examiner* — Bamidele A Immanuel
(74) *Attorney, Agent, or Firm* — Sage Patent Group (57) ABSTRACT

A multi-step coherent combination of signals received by multiple distributed phased antenna arrays to increase the coverage area of the distributed phase antenna arrays while decreasing the loss of such antennas, particularly in sections of a service area that traditionally are not covered by such antennas. More particularly, the solution presented herein coherently combines, in a multi-step coherent combination process, two or more data streams from two or more Phased Array Antenna Modules (PAAMs) to generate output data for the corresponding wireless device. In so doing, the solution presented herein achieves diversity gain in some scenarios, e.g., when adjacent PAAMs have partially overlapping frequency ranges, facilitates unsymmetrical BW support for uplink (UL) and downlink (DL) implementations, and/or provides service to more users.

19 Claims, 11 Drawing Sheets

(56) References Cited

U.S. PATENT DOCUMENTS

| | | | | |
|---|---|---|---|---|
| 6,710,742 | B1* | 3/2004 | Meredith | H01Q 3/28 342/372 |
| 6,788,661 | B1* | 9/2004 | Ylitalo | H04W 52/42 370/320 |
| 6,933,909 | B2* | 8/2005 | Theobold | H01Q 21/28 343/893 |
| 7,418,067 | B1* | 8/2008 | Li | H04B 7/084 375/135 |
| 7,812,759 | B2* | 10/2010 | Kai | G01S 13/34 342/107 |
| 8,345,716 | B1* | 1/2013 | Ehret | H04B 7/10 455/562.1 |
| 9,543,656 | B2* | 1/2017 | Sato | H01Q 21/28 |
| 10,505,609 | B2* | 12/2019 | Zimmerman | H01Q 25/001 |
| 10,608,334 | B2* | 3/2020 | Schuehler | H04B 7/0617 |
| 11,677,145 | B1* | 6/2023 | Sharma | H01Q 3/2682 342/372 |
| 2002/0175862 | A1* | 11/2002 | Hunter | H01Q 1/521 343/810 |
| 2005/0012658 | A1* | 1/2005 | Eriksson | H01Q 3/267 342/368 |
| 2005/0159196 | A1* | 7/2005 | Fang | H01Q 9/0421 455/575.1 |
| 2005/0195103 | A1* | 9/2005 | Davis | H01Q 21/22 342/158 |
| 2009/0143038 | A1* | 6/2009 | Saito | H01Q 21/28 455/272 |
| 2011/0169713 | A1* | 7/2011 | Asplund | H01Q 21/205 343/893 |
| 2013/0257680 | A1* | 10/2013 | Nix | H01Q 1/007 343/893 |
| 2013/0272227 | A1 | 10/2013 | Gallagher et al. | |
| 2013/0293417 | A1* | 11/2013 | Tong | H01Q 21/28 342/359 |
| 2014/0018004 | A1 | 1/2014 | Li et al. | |
| 2015/0089549 | A1 | 3/2015 | Trerise et al. | |
| 2015/0325913 | A1* | 11/2015 | Vagman | H01Q 3/34 342/368 |
| 2016/0141754 | A1* | 5/2016 | Leyh | H01Q 21/0075 342/372 |
| 2016/0261326 | A1 | 9/2016 | Barker et al. | |
| 2017/0338558 | A1* | 11/2017 | West | H01Q 21/0025 |
| 2017/0366242 | A1* | 12/2017 | Lee | H01Q 3/24 |
| 2018/0026379 | A1 | 1/2018 | Barker et al. | |
| 2018/0359010 | A1* | 12/2018 | Lee | H04B 7/06 |
| 2019/0089419 | A1 | 3/2019 | Kim | H01Q 21/28 |
| 2019/0110209 | A1* | 4/2019 | Senior | H04W 72/046 |
| 2019/0115658 | A1* | 4/2019 | Iannotti | H01P 1/184 |
| 2019/0222296 | A1* | 7/2019 | Khandani | H04B 7/086 |
| 2020/0243957 | A1* | 7/2020 | Ueda | H01Q 1/38 |
| 2020/0388921 | A1* | 12/2020 | Wang | H01Q 1/246 |

\* cited by examiner

MRC COMBINED DISTRIBUTED PHASED ANTENNA ARRAYS

TECHNICAL FIELD

The solution presented herein relates generally to distributed phased antenna arrays, and more particularly to increasing the coverage area for such antenna arrays.

BACKGROUND

The fifth generation (5G) cellular system is being defined and developed to improve upload and download speed, network reliability, capacity, etc. 5G systems may use an Advanced Antenna System (AAS) to improve performance, where a phase (or time delay) controlled array of antenna elements enables beamforming of the transmitted and received RF signals. Such beamforming capabilities may increase capacity as well as coverage for a cellular system.

The 5G system is planned to be deployed on existing frequency bands, as well as on new frequency bands. It is expected that the bandwidth of each defined operating band will scale with the carrier frequency. As such, a bandwidth as high as several GHz will be common for high frequency bands, e.g., frequency bands in the 24-43 GHz frequency range as designated in 3GPP TS 38.104. At high frequencies (e.g., 24-43 GHz or 24.25-52.6 GHz), it is foreseen that the AAS will be used by both the User Equipment (UE) and the Base Transceiver Station (BTS) to improve coverage and capacity. Furthermore, systems operating in the higher frequency ranges (e.g., 24-43 GHz or 24.25-52.6 GHz) will be deployed in densely populated areas at street level. Therefore, there is an increasing interest for phased antenna arrays that support wide angle service areas, e.g., 180° and 360° service areas. Such wide angle service areas, as well as loss, thermal, and beam size issues may cause conflicting goals for the AAS. As such, there remains a need for improved AAS, particularly the signal processing associated with AAS.

SUMMARY

The solution presented herein increases the coverage area and capacity of distributed phased antenna arrays while decreasing the loss of such antenna arrays, particularly in sections of a service area that traditionally are not covered by such antenna arrays. To that end, transceivers according to the solution presented herein use a multi-step coherent combination of two or more data streams to generate output data for the corresponding wireless device. In so doing, the solution presented herein achieves diversity gain in some scenarios, e.g., when adjacent PAAMs have partially overlapping frequency ranges, facilitates unsymmetrical BW support for uplink (UL) and downlink (DL) implementations, increases the signal-to-noise ratio (SNR), and/or provides service to more users.

One exemplary embodiment comprises an Advanced Antenna System (AAS) for a wireless transceiver. The AAS comprises a first Phased Antenna Array Module (PAAM), a second PAAM, a system combiner and a processing circuit. The first PAAM comprises a plurality of first antenna elements arranged according to a first geometry. Further, the first PAAM comprises a first combiner configured to coherently combine a signal received by the plurality of first antenna elements responsive to the first geometry to generate a first combined signal. The second PAAM comprises a plurality of second antenna elements arranged according to a second geometry. Further, the second PAAM comprises a second combiner configured to coherently combine a signal received by the plurality of second antenna elements responsive to the second geometry to generate a second combined signal. The system combiner is configured to apply channel equalization to the first and second combined signals responsive to a known reference signal. Further, the system combiner is configured to coherently combine the channel equalized first and second combined signals using Maximum Ratio Combining (MRC) to generate a combined output signal. The processing circuit is configured to output data for use by the wireless transceiver responsive to the combined output signal.

One exemplary embodiment comprises a method of receiving signals in an Advanced Antenna System (AAS) for a wireless transceiver. The AAS comprises a first Phased Array Antenna Module (PAAM) comprising a plurality of first antenna elements arranged according to a first geometry and a second PAAM comprising a plurality of second antenna elements arranged according to a second geometry. The method comprises coherently combining a signal received by the plurality of first antenna elements responsive to the first geometry to generate a first combined signal. The method further comprises coherently combining a signal received by the plurality of second antenna elements responsive to the second geometry to generate a second combined signal. The method further comprises applying channel equalization to the first and second combined signals responsive to a known reference signal. The method further comprises coherently combining the channel equalized first and second combined signals using Maximum Ratio Combining (MRC) to generate a combined output signal. The method further comprises outputting data for use by the wireless transceiver responsive to the combined output signal.

One exemplary embodiment comprises an Advanced Antenna System (AAS) for a wireless transceiver, the AAS comprising one or more processing circuits. The processing circuits are configured to execute the above described method.

One exemplary embodiment comprises a computer program product for controlling an Advanced Antenna System (AAS) for a wireless transceiver. The computer program product comprising instructions which, when run on one or more processing circuits in the AAS, causes the AAS to execute the above described method.

DETAILED DESCRIPTION

Advanced Antenna Systems (AASs) may be constructed with multiple antenna modules, e.g., multiple spatially separated Phased Antenna Array Modules (PAAMs), where each module comprises multiple antenna elements and where each module is responsible for a particular angular sector of the service area. The angle between the left and right PAAMs, as well as the overall antenna size and design, may be optimized for the desired service area. For example, the antenna spacing in each PAAM impacts the service area for each PAAM, as well as the peak directivity. As such, these variables may be controlled to optimize coverage for the desired service area.

Figure 1:
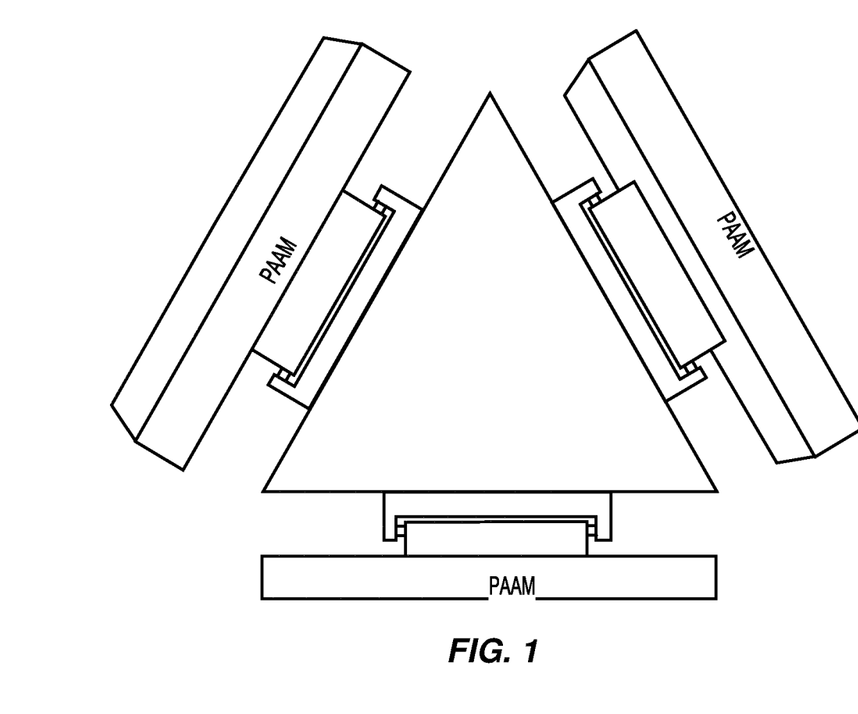
FIG. 1 shows an Advanced Antenna System (AAS) comprising three Phased Antenna Array Modules (PAAMs).
Figure 2:
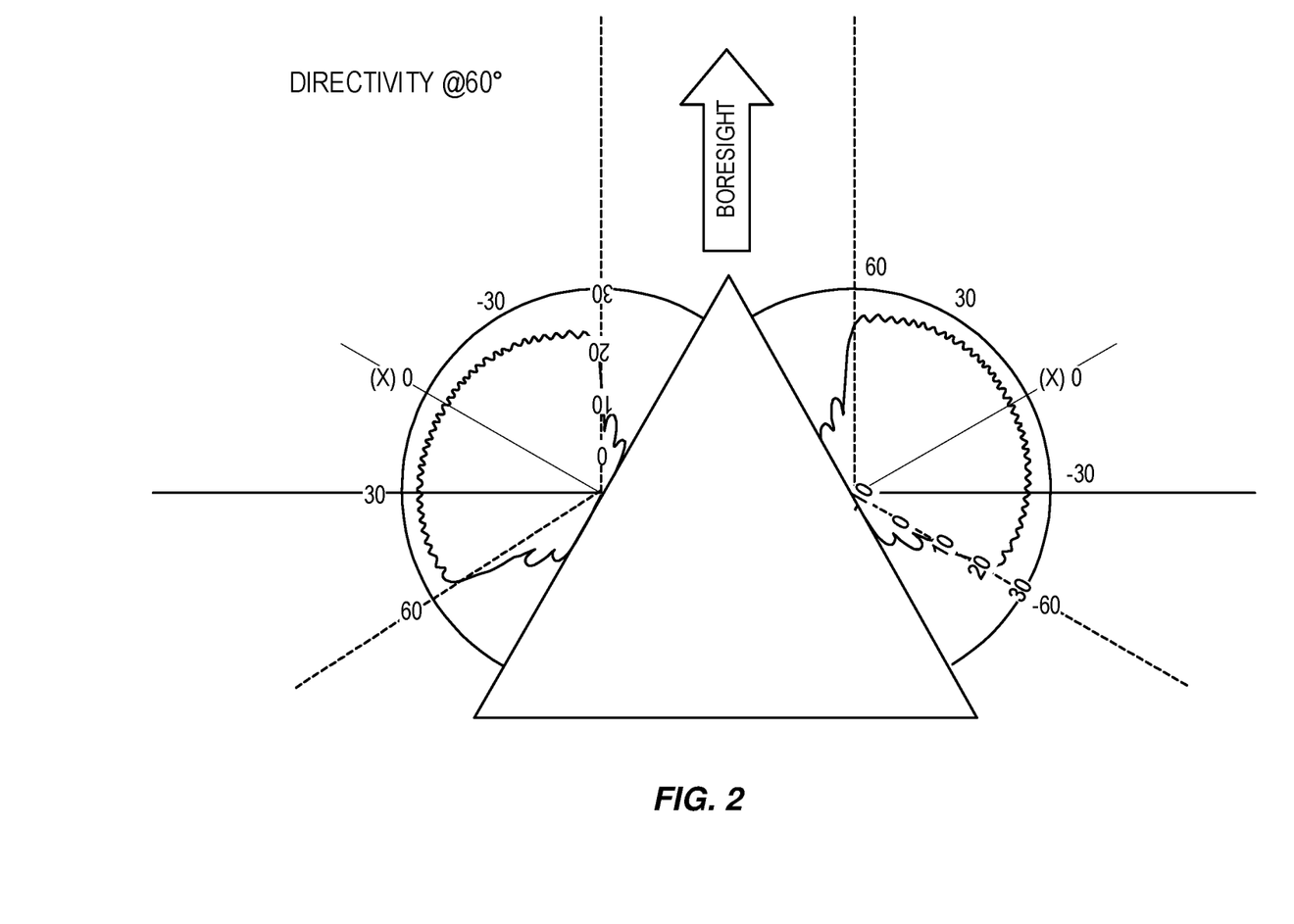
FIG. 2 shows an exemplary coverage area for two of the PAAMs of FIG. 1.
Figure 3:
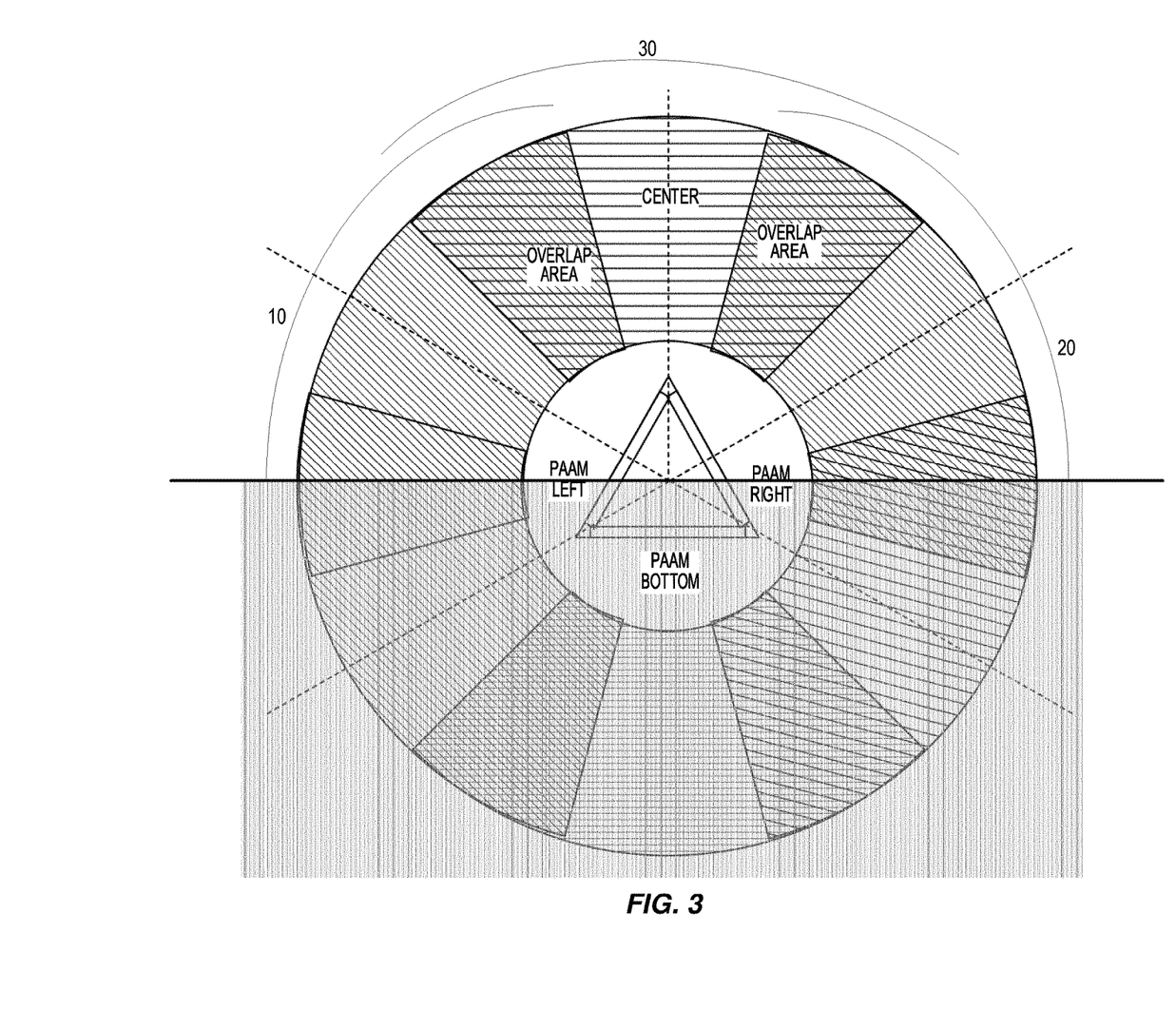
FIG. 3 shows another view of an exemplary coverage area for the PAAMs of FIG. 1.

FIG. 1, for example, demonstrates an exemplary AAS constructed with three PAAMs, each of which connects to a triangular printed circuit board (PCB) via a corresponding flex cable. The PCB controls the tilt angle of each PAAM relative to the PCB to selectively control the service area. When the PCB activates two PAAMs, the AAS supports a 180° service area (e.g., as shown in FIG. 2 and the top half of FIG. 3), while when the PCB activates all three PAAMs the AAS supports a 360° service area (e.g., as shown in FIG. 3). As shown in FIGS. 2 and 3, however, such a modular antenna array implementation results in angles in between each PAAM's service area having degraded antenna gain/performance, e.g., the boresight region shown in FIG. 2. For example, the top half of FIG. 3 (e.g., the part above the horizontal line) shows a 180° service area divided into three sectors (or portions): a left sector 10, a right sector 20, and a center sector 30. As shown in the top half of FIG. 3, the left PAAM covers or is otherwise allocated the left sector 10, and the right PAAM covers or is otherwise allocated to the right sector 20. The center sector 30, however, includes parts of both the left and right sectors 10, 20, as well as a non-overlapping portion that does not overlap with either the left or right sectors 10, 20. The non-overlapping part of the center sector 30 experiences significant signal degradation, while the parts of the center sector 30 overlapping the left sector 10 or right sector 20 experience some signal degradation, which generally decreases as the incoming beam direction moves closer to either the left sector 10 or the right sector 20.

When the incoming beam direction is towards the center sector 30, both PAAMs may be activated to actively receive signals. If the incoming beam direction moves either to the left or to the right of the center sector 30, e.g., into an overlapping portion of the center sector 30 or fully into the left sector 10 or right sector 20, the AAS may still use both PAAMs to improve performance, or may alternatively activate only one of the PAAMs to conserve power. Thus, according to some exemplary embodiments of the solution presented herein, the AAS may selectively activate one or both PAAMs, e.g., using a mode switch based on a beam index in a Grid of Beam (GoB) beamforming scenario.

One way to reduce the size of the non-overlapping portion of the center sector is to increase the size of each PAAM, e.g., by increasing the number of antenna elements in each PAAM. Such size increases also scale the Effective Isotropic Radiated Power (EIRP) by $20 \log_{10}(N)$, and scale the Effective Isotropic Sensitivity (EIS) by $10 \log_{10}(N)$, where N represents the number of antenna elements in the corresponding PAAM. However, thermal issues caused by the proximity of the controlling Printed Circuit Boards (PCBs) to the corresponding PAAM, which are generally placed close to the corresponding PAAM to reduce PCB losses in the mm-wave frequency range, place practical restrictions on the size of each PAAM. Further, analog beamforming implemented with large PAAMs produces very narrow beams. While such narrow beams are generally good for the overall link budget, such narrow beams may also result in excessive beam switching in high mobility scenarios and/or may result in fewer UEs being available for frequency multiplexing. Further, the received angular spread for uplink signaling may be wider than the beam width, particularly in narrow beam situations, which results in a loss of power. As such, simply increasing the size of the PAAMs used in an AAS causes additional problems, and in some cases, causes more problems than it solves.

Instead of solely relying on the size of each PAAM to control the coverage within the service area, the solution presented herein uses signal processing that implements a multi-step coherent combination of the signals received by multiple PAAMs when multiple PAAMs are activated to address the degraded service area issues caused by such multiple, spatially separated PAAMs. In so doing, the solution presented herein provides service to more users, covers more of the service area with the desired signal quality, achieves diversity gain in some scenarios, e.g., when adjacent PAAMs have partially overlapping frequency ranges, and/or facilitates unsymmetrical BW support for uplink (UL) and downlink (DL) implementations. While the following describes the solution presented herein in terms of two PAAMs, e.g., that cover a 180° service area, it will be appreciated that the solution presented herein also applies to AASs having three or more PAAMs.

Figure 4:
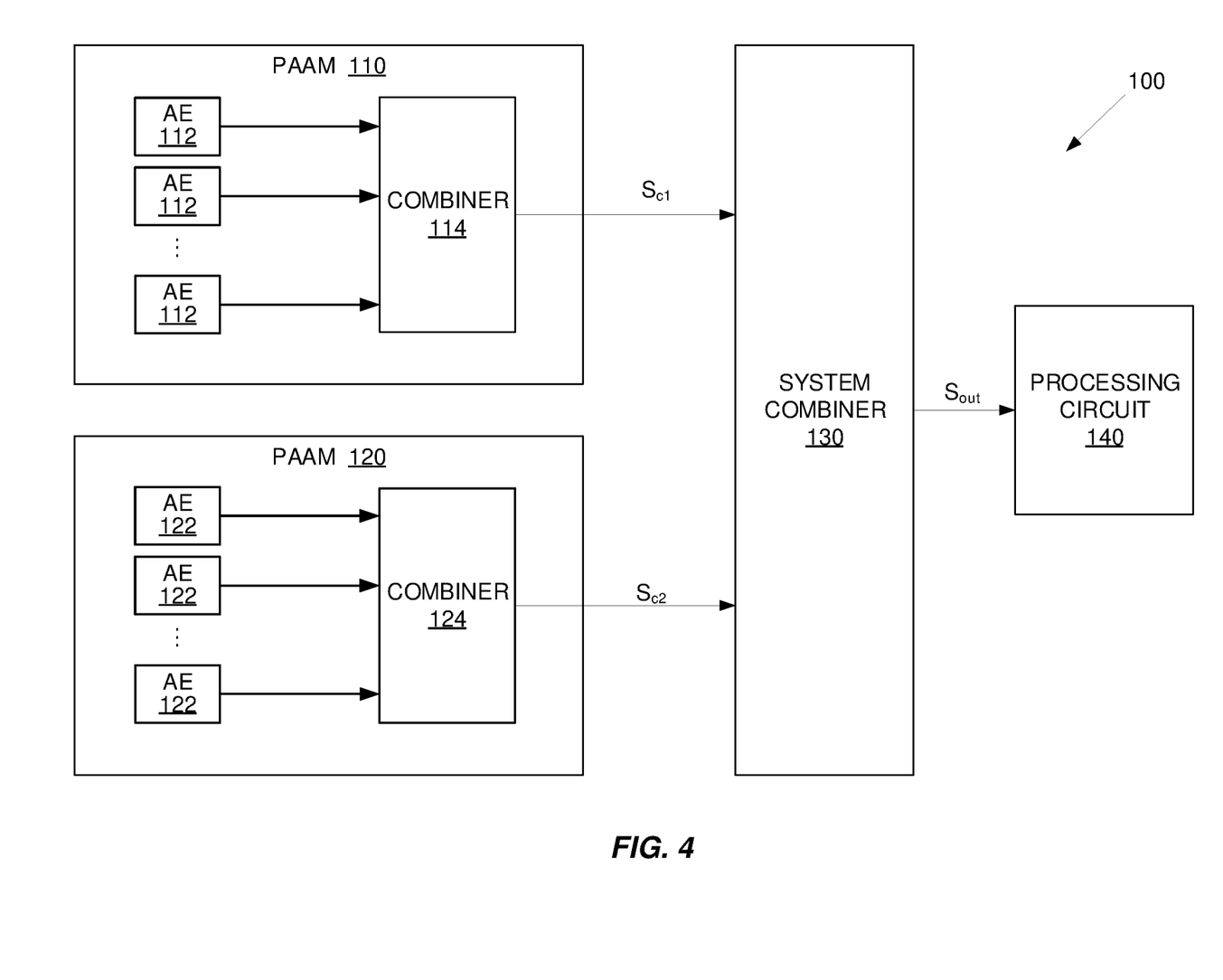
FIG. 4 shows a block diagram of an AAS according to one exemplary embodiment of the solution presented herein.
Figure 5:
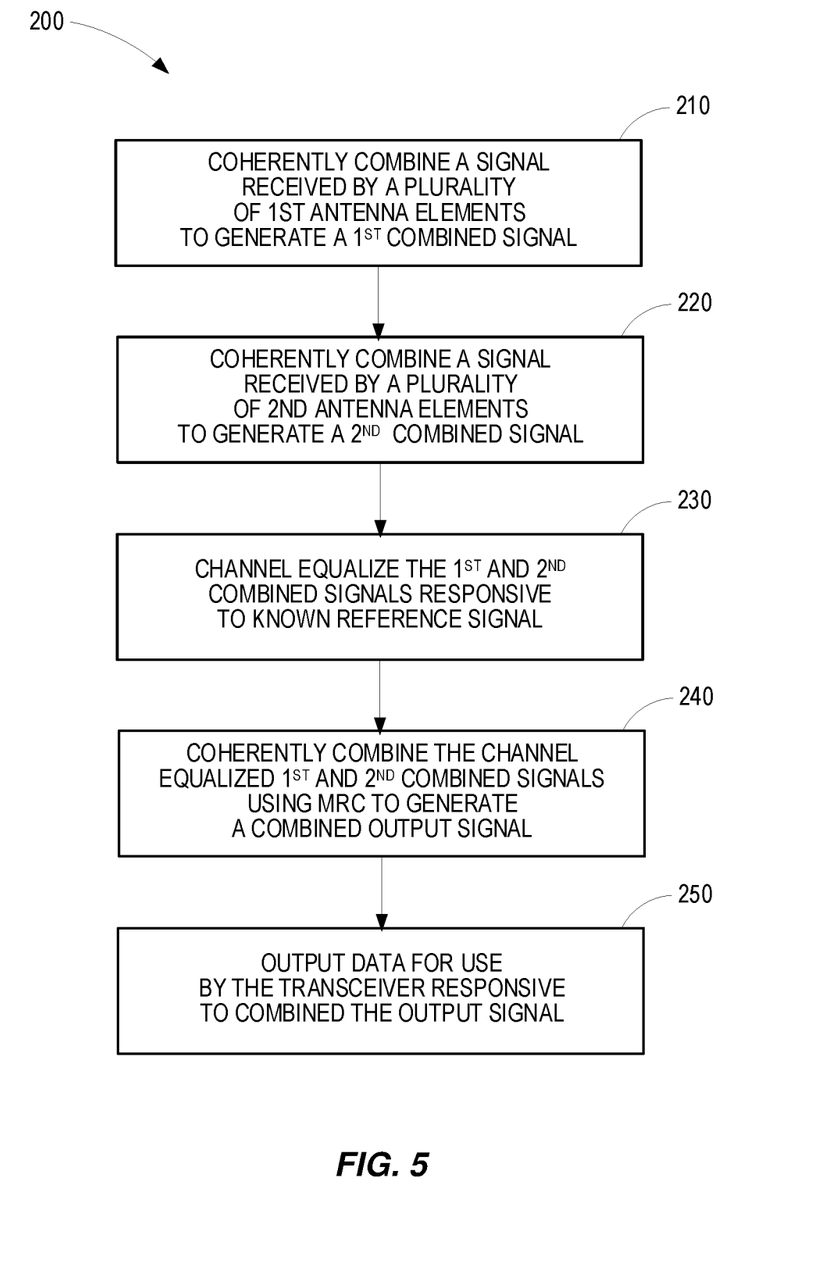
FIG. 5 shows a method of coherently combining signals in an AAS according to one exemplary embodiment of the solution presented herein.

FIGS. 4 and 5 respectively show an exemplary AAS 100 for a wireless transceiver and the corresponding method 200 according to the solution presented herein. The AAS 100 comprises a first PAAM 110, a second PAAM 120, a system combiner 130, and a processing circuit 140. The first PAAM 110 comprises a plurality of first antenna elements 112 arranged according to a first geometry and a first combiner 114. The first combiner 114 is configured to coherently combine a signal received by the plurality of first antenna elements 112 responsive to the first geometry to generate a first combined signal $S_{c1}$ (block 210). Similarly, the second PAAM 120 comprises a plurality of second antenna elements 122 arranged according to a second geometry and a second combiner 124, where the second combiner 124 is configured to coherently combine a signal received by the plurality of second antenna elements 122 responsive to the second geometry to generate a second combined signal $S_{c2}$ (block 220). The system combiner 130 is configured to apply channel equalization to the first and second combined signals responsive to a known reference signal (block 230). The system combiner 130 is further configured to coherently combine the channel equalized first and second combined signals using Maximum Ratio Combining (MRC) to generate a combined output signal $S_{out}$ (block 240). The processing circuit 140 is configured to output data for use by the wireless transceiver 100 responsive to the combined output signal (block 250). The wireless transceiver 100 may, for example, use the output data to provide requested media (e.g., music, text, video, etc.) or information (e.g., map services, directions, etc.) to a user.

Figure 6:
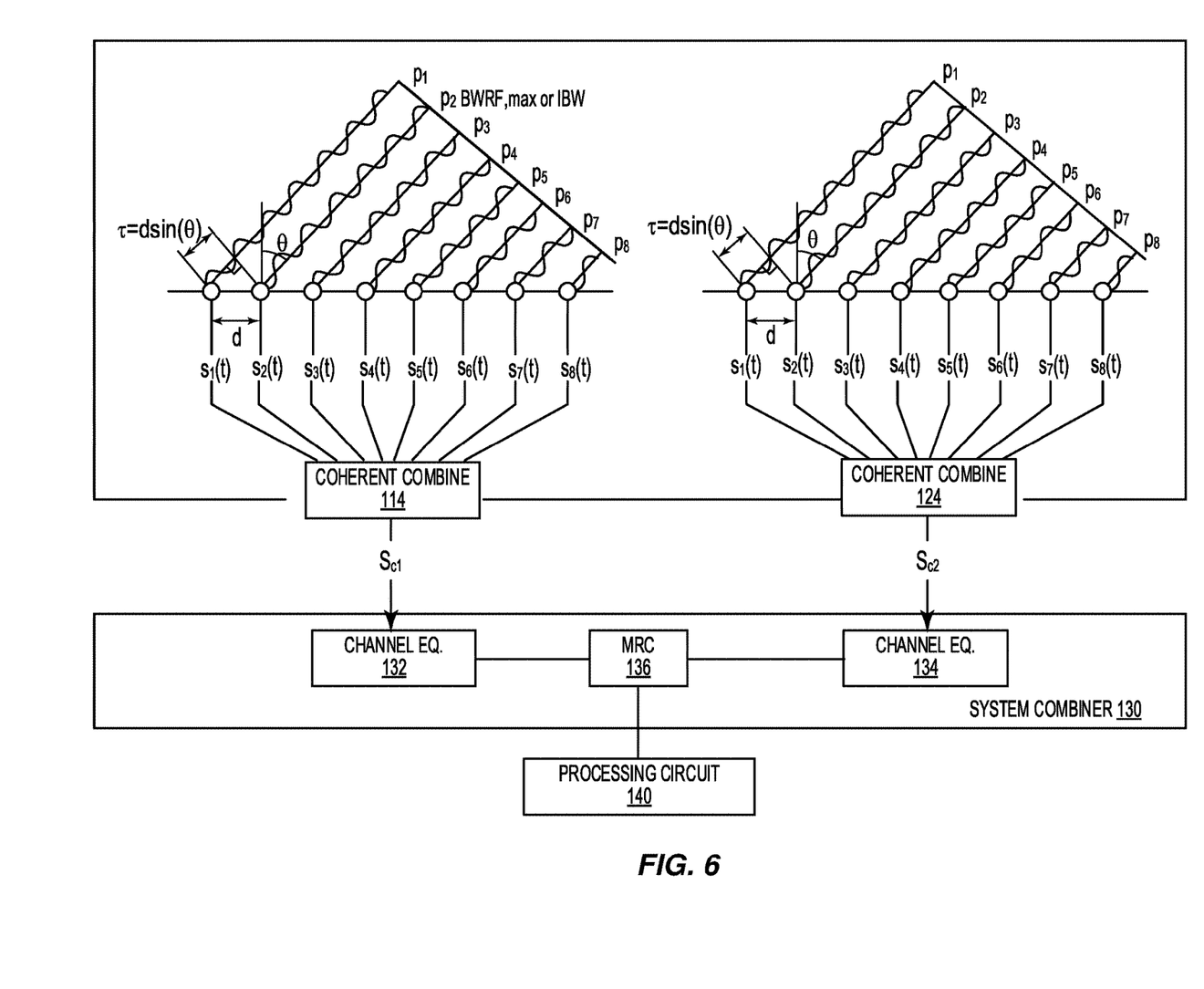
FIG. 6 shows a diagram of an AAS according to one exemplary embodiment of the solution presented herein.

FIG. 6 shows an exemplary implementation of the AAS 100 of FIG. 4, in which the antenna elements 112, 122 of the corresponding PAAM 110, 120 are spaced apart in at least one dimension by a distance d. Each antenna element 112, 122 outputs a signal $s_n(t)$ from the $N^{th}$ antenna element 112, 122 to the corresponding first and second combiners 114, 124, which coherently combines the input antenna signals responsive to the distance d to generate the corresponding first and second combined signals $S_{c1}$, $S_{c2}$. The system combiner 130 then applies channel equalization to the first and second combined output signals, e.g., responsive to a known reference signal received by the AAS 100, and coherently combines the channel equalized signals using MRC to generate a combined output signal, which is output to the processing circuit 140 to output the data responsive to the combined output signal. In some embodiments, e.g., when both PAAMs are active to handle an incoming beam in the center sector, this operation of the system combiner 130 is responsive to the direction of the corresponding incoming beam.

Figure 7:
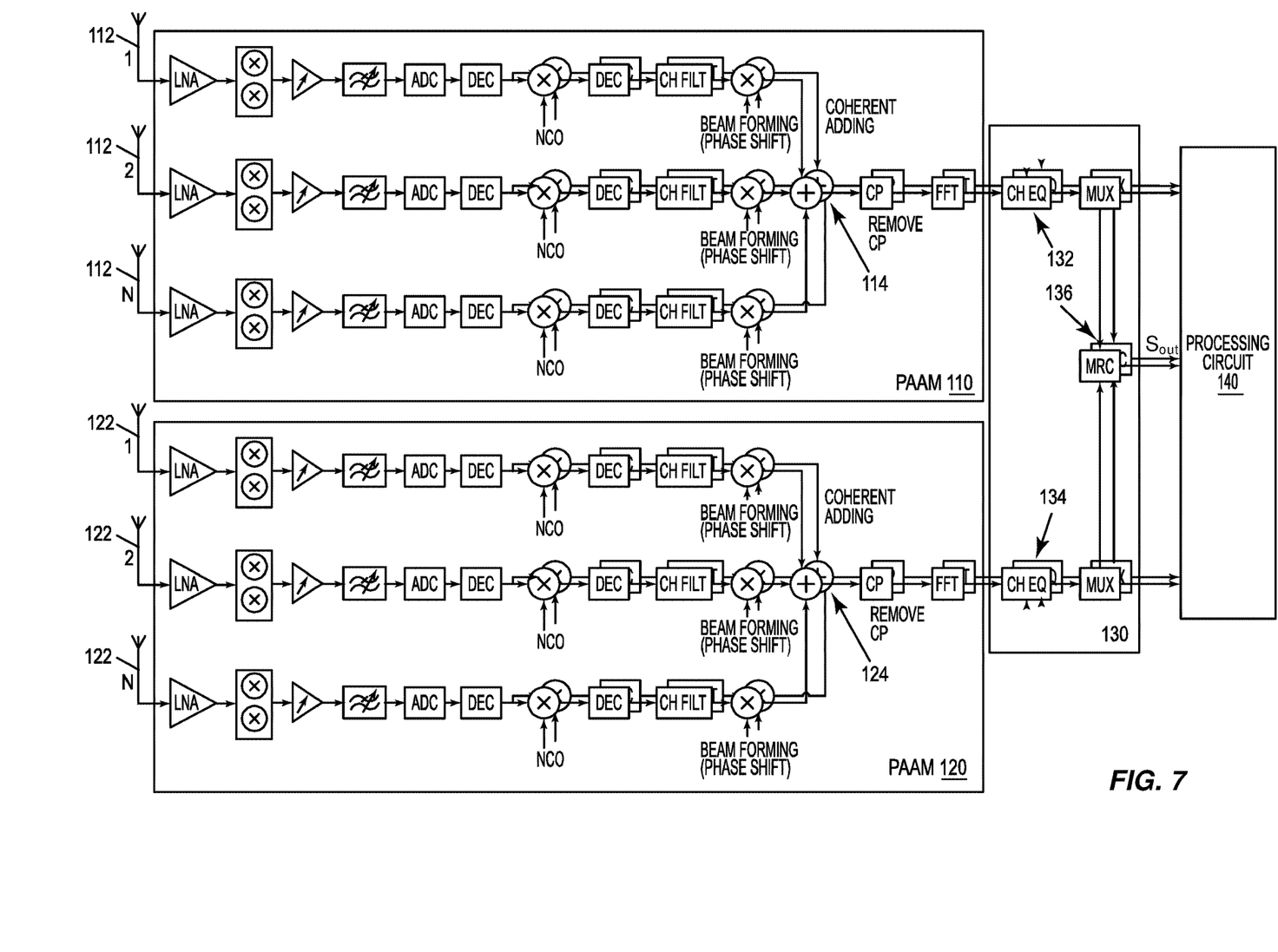
FIG. 7 shows a circuit diagram of an AAS according to one exemplary embodiment of the solution presented herein.
Figure 8:
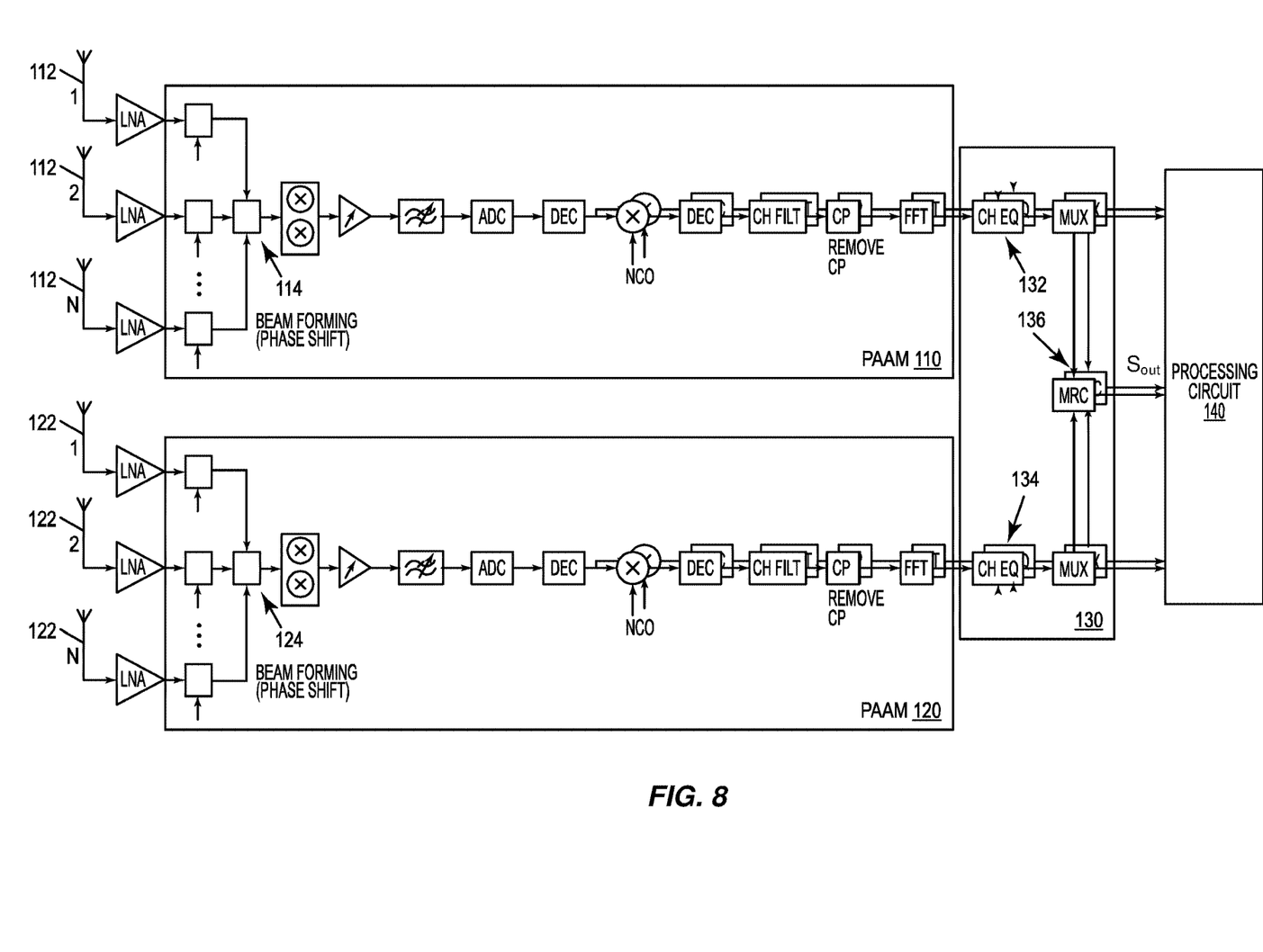
FIG. 8 shows a circuit diagram of an AAS according to one exemplary embodiment of the solution presented herein.

While the above generally describes the solution presented herein, FIGS. 7 and 8 provide detailed exemplary implementations. It will be appreciated that other implementations in keeping with the general description of FIGS. 4-6 are also applicable.

FIG. 7 shows one exemplary implementation according to the solution presented herein with two PAAMs (PAAM 110 and PAAM 120), that are physically separated from each other, e.g., as shown in FIG. 1. After each signal from the corresponding antenna element 112, 122 is amplified, downconverted, filtered, converted to digital, and phase shifted (for beamforming), these digital phase-shifted signals are combined in corresponding combiners 114, 124. The system combiner 130 then applies channel equalization (e.g., using channel estimates determined responsive to known reference signals received from the UE), multiplexes, and MRC combines the combined signals output by the PAAMs 110, 120 to generate a combined output signal. For example, the system combiner 130 may comprise a first channel equalization circuit 132, a second channel equalization circuit 134, and an MRC combiner 136. The first channel equalization circuit 132 applies channel equalization responsive to known symbols received by the PAAMs, e.g., known reference symbols, to the combined signal from combiner 114, and the second channel equalization circuit 134 applies channel equalization responsive to the known symbols to the combined signal from combiner 124. The MRC combiner 136 coherently combines the channel equalized signals output from the first and second channel equalization circuits 132, 134 to generate the combined output signal $S_{out}$. For implementations where the AAS optionally chooses to not perform the second coherent combination, multiplexed channel equalized signals may instead be output directly to the processing circuit 140.

FIG. 8 shows an alternative to FIG. 7, where the MRC combing is done between the two PAAMs 110, 120, and which is built based on an analogue beamforming architecture. More particularly, each signal from the corresponding antenna element 112, 122 is phase shifted (for beamforming), and first and second combiners 114, 124 respectively combine the analog phase-shifted outputs of each antenna element 112, 122. The combined signals are each amplified, downconverted, filtered, and converted to digital. The system combiner 130 operates the same as in FIG. 7, where the multiplexing and MRC combination occurs after the channel equalization.

In both the exemplary implementation of FIG. 7 and the exemplary implementation of FIG. 8, the processing circuit 140 either processes the data from each of the PAAMs 110, 120, or processes MRC signals, e.g., MRC In-phase/Quadrature (IQ) signals, from both PAAMs 110, 120 using the multi-step coherent combining of the solution presented herein. More particularly, the processing circuit 140 processes the combined output signal and outputs the corresponding data for use by the corresponding device, e.g., to provide data to a user.

Figure 9:
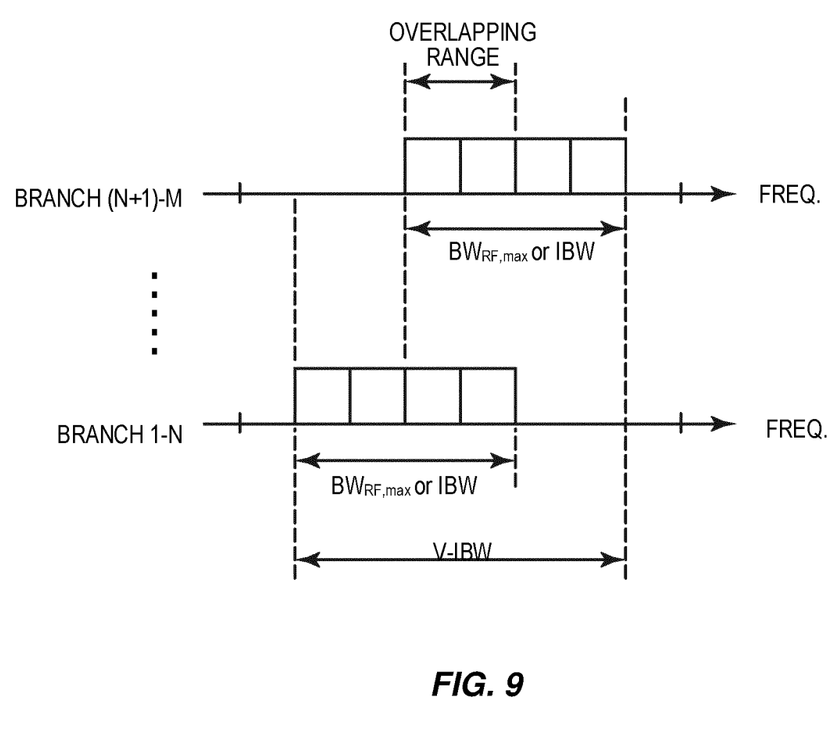
FIG. 9 shows exemplary frequency ranges for different PAAMs according to one exemplary embodiment of the solution presented herein.

In some exemplary embodiments, e.g., the embodiment of FIG. 7, the AAS 100 may be configured for sub-band (or sub-range) beamforming in the time domain (FIG. 7 only shows two frequency sub-bands for simplicity). For example, each PAAM 110, 120 may be configured for particular frequency sub-bands, e.g., the first PAAM 110 may be configured to transmit and receive four first carriers/sub-bands, while the second PAAM 120 may be configured to transmit and receive four second carriers/sub-bands. When the first and second frequency sub-bands at least partially overlap, the AAS 100 may implement the multi-step coherent combining of the solution presented herein. For example, when two of the first and second frequency sub-bands overlap, e.g., as shown in FIG. 9, the AAS implements the multi-step coherent combining of the solution presented herein for the overlapping carriers/sub-bands. In scenarios where carrier aggregation is used, the Primary Component Carrier (PCC) may be placed on the frequency where there is a frequency overlap, while Secondary Component Carriers (SCCs) may be placed on the other frequency carriers/sub-bands. This exemplary implementation may improve Uplink (UL) sensitivity, which improves the link between the UE and Base Transceiver Station (BTS) for control channels that are placed on the PCC.

Figure 10:
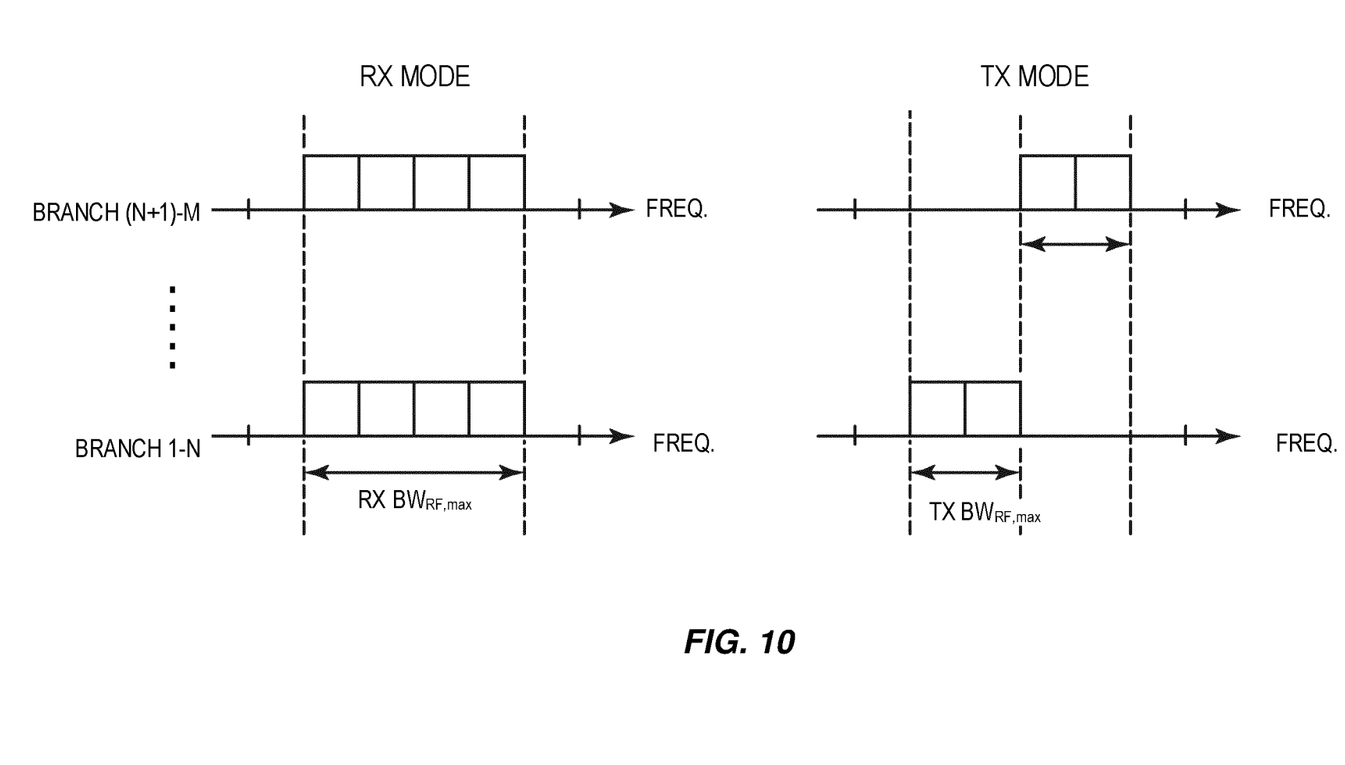
FIG. 10 shows exemplary frequency ranges for different PAAMs according to one exemplary embodiment of the solution presented herein.

FIG. 10 shows an alternative embodiment where the first and second PAAMs 110, 120 are configured for unsymmetrical UL and Downlink (DL) operation, e.g. the first and second PAAMs 110, 120 are configured for the same carriers/sub-bands when receiving, but for different, non-overlapping carriers/sub-bands when transmitting. Those skilled in the art understand that it is easier to build high bandwidth receivers than to build high bandwidth transmitters, and the embodiment of FIG. 10 takes advantage of this. For example, each PAAM covers a bandwidth of "X" MHz, which results in a transmission bandwidth of X MHz and a reception bandwidth is 2X MHz. Such an unsymmetrical implementation may be achieved by using two separate PAAMs, e.g., PAAM 110 and PAAM 120, or by splitting a single PAAM into two sub-panels, as discussed further below.

The exemplary embodiment of FIG. 8 may be limited to applications where the incoming beams all point in the same direction (e.g., all phase shifting circuits apply the same phase shift). As such, the implementation of FIG. 8 may not as useful for partial overlapping frequency ranges, e.g., as shown in in FIGS. 9 and/or 10, and may place tighter dynamic range requirements on the analog-to-digital converters. However, because the exemplary implementation of FIG. 8 phase shifts and combines the signals from each antenna elements at an earlier point in the receiver chain, the exemplary implementation of FIG. 8 advantageously simplifies the time delay synchronization, and reduces the number of amplifiers, downconverters, filters, and analog-to-digital converters.

Figure 11:
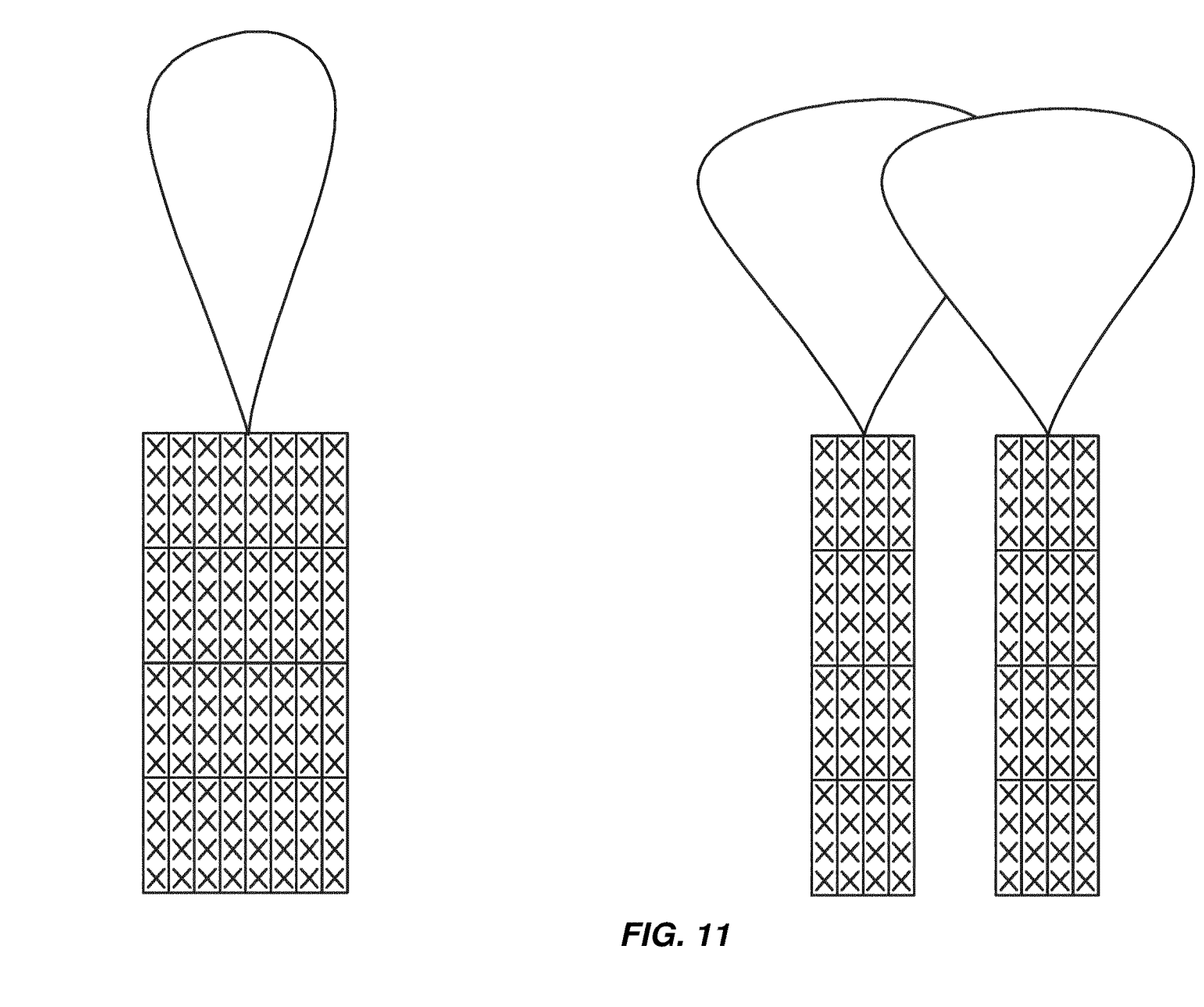
FIG. 11 shows an exemplary PAAM split into two subpanels according to one exemplary embodiment of the solution presented herein.

In some exemplary embodiments, a PAAM having N antenna elements may be split into multiple sub-panels. For example, when the PAAM is split into two equal sub-panels, each having N/2 antenna elements, the beamwidth achievable by each sub-panel is twice as wide as that achievable with the single PAAM having N antenna elements. When both incoming beams (for each sub-panel) point in the same direction (e.g., all phase shifting circuits apply the same phase shift), as shown in FIG. 11, the multi-step coherent combination per the solution presented herein as applied to the sub-panels extends, e.g., doubles, the service area due to the double-wide beams, which enables more users (i.e., UEs) to be covered. In this embodiment, the UEs may also be frequency multiplexed, which further allows for higher Power Spectral Density (PSD) from each UE. While splitting a large panel into smaller sub-panels may result in a reduced DL link margin, the wider beams provided by this implementation means power control may be used to address more users in parallel.

This split panel implementation may, e.g., be used for the unsymmetrical UL/DL implementation discussed above. For example, a single PAAM, e.g., PAAM 110, may be split into multiple sub-panels, e.g., as shown in FIG. 11, where each sub-panel may be used for a different portion of the frequency spectrum covered by the AAS. For example, one sub-panel comprising 50% of the antenna area (i.e., 50% of the N antenna elements) may be used for a lower part of a frequency range (e.g., "$X_L$" bandwidth), while another sub-panel comprising the remaining antenna area may be used for an upper part of the frequency range (e.g., $X_U$ bandwidth). As such, for transmission, only one of the sub-panels is used, e.g., to transmit either in the upper frequency range or the lower frequency range, and the entire antenna area may be used for the total reception frequency range encompassing both the upper and frequency ranges (e.g., $X_L+X_U$ bandwidths). By splitting one PAAM into two sub-panels, as shown in FIG. 11, each transmission beam has a narrower beamwidth, and thus achieves a higher Power Spectral Density (PSD), while simultaneously providing the full bandwidth for reception. In so doing, this exemplary embodiment adds the two PAAM signals coherently in the UL and improves sensitivity, e.g., by 3 dB.

The solution presented herein may also be used as a diversity combining solution in a single receiving station. For example, UL Coordinated Multi-Point (COMP) is one UL diversity technique that combines signals received by multiple base stations to improve UL signal quality and interference suppression. Such multi-base station solutions, however, require significant signaling between the base stations. The solution herein provides an alternate diversity solution, where signals received by different PAAMs of the same transceiver, e.g., the same base station, are combined, where the different PAAMs may cover the same sector or different sectors, as discussed herein. As a result, the PAAMs involved are within the UE's transmission beam, which simplifies the diversity combination. Further, the communications associated with the diversity combination are significantly simplified relative to the multi-base station approach.

The solution presented herein uses a multi-step coherent combination of received signals to extend a service area, extend frequency coverage (in one or more incoming beam directions), and/or provide coverage in previously uncovered (or weakly covered) portions of a service area. In particular, without the multi-step combination of the solution presented herein, the three PAAM implementation of FIG. 1, where each PAAM covers 120° of a 360° service area may need to be replaced with a four PAAM implementation, where each PAAM covers 90° of a 360° service area. Thus, the solution presented herein provides a smaller, more energy efficient solution. While not required, the multi-step coherent combination may be applied to two or more IQ data streams (e.g., soft bits) even when the distance separating the corresponding PAAMs is large. Further, as discussed herein, the solution presented herein enables an increase in diversity gain for various scenarios, e.g., when different PAAMs cover different but overlapping frequency ranges, for a time-domain sub-band beamforming architectures, etc. Further still, the solution presented herein facilitates unsymmetrical bandwidth support in the UL and the DL for each PAAM. It will be appreciated that while the solution presented herein prevents the size of the PAAM from being the sole technique for increasing the service area, the PAAMs of the AAS according to the solution presented herein still need to be sufficiently large to enable accurate channel estimation. Thus, depending on the angular spread of the incoming beam, there is an optimum unit PAAM size for collecting most of the received energy per PAAM and using the multi-step coherent combination of the solution presented herein to optimize the overall Signal-to-Noise Ratio (SNR).

The solution presented herein may be embodied in hardware (e.g., circuits, modules, and/or units) and/or in software (including firmware, resident software, micro-code, etc.), including an application specific integrated circuit (ASIC). Furthermore, the solution presented herein may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The AAS of the solution presented herein may be implemented as part of any wireless transceiver, including but not limited to, a User Equipment (UE), a mobile terminal, a base station, a network node, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An Advanced Antenna System (AAS), comprising:
a first Phased Antenna Array Module (PAAM) allocated to a first portion of a spatial coverage area of the AAS and comprising:
  a plurality of first antenna elements arranged according to a first geometry; and
  a first combiner configured to coherently combine a first signal received by the plurality of first antenna elements responsive to the first geometry to generate a first combined signal;
a second PAAM allocated to a second portion of the spatial coverage area of the AAS that is non-overlapping with the first portion of the spatial coverage area, the second PAAM comprising:
  a plurality of second antenna elements arranged according to a second geometry; and
  a second combiner configured to coherently combine a second signal received by the plurality of second antenna elements responsive to the second geometry to generate a second combined signal;
a system combiner configured to:
  apply channel equalization, to each of the first and second combined signals, responsive to a known reference signal received by the AAS; and
  coherently combine the channel equalized first and second combined signals using Maximum Ratio Combining (MRC) when an incoming beam direction is from the spatial coverage area of the AAS but outside the first and second portions of the spatial coverage area to generate a combined output signal; and
a processing circuit configured to output data to be used by a wireless transceiver responsive to the combined output signal, wherein an incoming beam direction for the first and second PAAMs is the same.

2. The AAS of claim 1, wherein:
a third portion of the spatial coverage area includes a gap between the first and second portions of the spatial coverage area and a fraction of the first and second portions abutting each side of the gap; and
the system combiner is configured to coherently combine the channel equalized first and second combined signals using the MRC when an incoming beam direction is from the third portion of the spatial coverage area of the AAS.

3. The AAS of claim 1 wherein
the system combiner is configured to coherently combine the channel equalized first and second combined signals using the MRC when an incoming beam direction is from a portion of the spatial coverage area where the first and second portions of the spatial coverage area at least partially overlap.

4. The AAS of claim 1, wherein the system combiner comprises:
  a first channel equalizer configured to apply channel equalization to the first combined signal responsive to the known reference signal received by the first PAAM to generate a first equalized signal;
  a second channel equalizer configured to apply channel equalization to the second combined signal responsive to the known reference signal received by the second PAAM to generate a second equalized signal; and
  an MRC combiner circuit configured to coherently combine the first and second equalized signals using the MRC to generate the combined output signal.

5. The AAS of claim 1, wherein:
the first PAAM further comprises:
  a plurality of first analog-to-digital converters, each configured to convert the signal received by the corresponding one of the plurality of first antenna elements to a first digital signal for each of the plurality of first antenna elements; and
  a plurality of first digital phase-shifting circuits, each operatively connected to a corresponding one of the plurality of first analog-to-digital converters and configured to apply a first digital phase to the corresponding first digital signal to generate a first digital phase-shifted signal for each of the plurality of first antenna elements, wherein the first combiner coherently combines the signal received by the plurality of first antenna elements by coherently combining the first digital phase-shifted signals to generate the first combined signal; and
the second PAAM further comprises:
  a plurality of second analog-to-digital converters, each configured to convert the signal received by the corresponding one of the plurality of second antenna elements to a second digital signal for each of the plurality of second antenna elements; and
  a plurality of second digital phase-shifting circuits, each operatively connected to a corresponding one of the plurality of second analog-to-digital converters and configured to apply a second digital phase to the corresponding second digital signal to generate a second digital phase-shifted signal for each of the plurality of second antenna elements, wherein the second combiner coherently combines the signal received by the plurality of second antenna elements by coherently combining the second digital phase-shifted signals to generate the second combined signal.

6. The AAS of claim 1, wherein:
the first PAAM further comprises:
  a plurality of first analog phase-shifting circuits, each configured to apply a first analog phase to the signal received by the corresponding one of the plurality of first antenna elements to generate a first phase-shifted signal for each of the plurality of first antenna elements, where the first combiner coherently combines the signal received by the plurality of first antenna elements by coherently combining the first phase-shifted signals to generate the first combined signal; and
  a first analog-to-digital converter configured to convert the first combined signal to a digital first combined signal;
the second PAAM further comprises:
  a plurality of second analog phase-shifting circuits, each configured to apply a second analog phase to the signal received by the corresponding one of the plurality of second antenna elements to generate a second phase-shifted signal for each of the plurality of second antenna elements, where the second combiner coherently combines the signal received by the plurality of second antenna elements by coherently combining the second phase-shifted signals to generate the second combined signal; and
  a second analog-to-digital converter configured to convert the second combined signal to a digital second combined signal; and
the system combiner is configured to apply the channel equalization to the digital first and second combined signals responsive to the known reference signal and to coherently combine the channel equalized digital first and second combined signals to generate the combined output signal.

7. A method of receiving signals in an Advanced Antenna System (AAS), the method comprising:
coherently combining a first signal received by a plurality of first antenna elements responsive to the plurality of first antenna elements being arranged according to a first geometry to generate a first combined signal, the plurality of first antenna elements being comprised in a first Phased Array Antenna Module (PAAM) of the AAS and allocated to a first portion of a spatial coverage area of the AAS;
coherently combining a second signal received by a plurality of second antenna elements responsive to the plurality of second antenna elements being arranged according to a second geometry to generate a second combined signal, the plurality of second antenna elements being comprised in a second PAAM of the AAS and allocated to a second portion of the spatial coverage area of the AAS, the second portion of the spatial coverage area being non-overlapping of the first portion of the spatial coverage area;
applying channel equalization to each of the first and second combined signals responsive to a known reference signal received by the AAS;
coherently combining the channel equalized first and second combined signals using Maximum Ratio Combining (MRC) when an incoming beam direction is from the spatial coverage area of the AAS but outside the first and second portions of the spatial coverage area to generate a combined output signal; and
outputting data to be used by a wireless transceiver responsive to the combined output signal, wherein an incoming beam direction for the first and second PAAMs is the same.

8. The method of claim 7, wherein:
a third portion of the spatial coverage area includes a gap between the first and second portions of the spatial coverage area and a fraction of the first and second portions abutting each side of the gap; and
coherently combining the channel equalized first and second combined signals comprises coherently combining the channel equalized first and second combined signals using the MRC when an incoming beam direction is from the third portion of the spatial coverage area of the AAS.

9. The method of claim 7, wherein
coherently combining the channel equalized first and second combined signals comprises coherently combining the channel equalized first and second combined signals using the MRC when the incoming beam direction is from a portion of the spatial coverage area where the first and second portions of the spatial coverage area at least partially overlap.

10. The method of claim 7, further comprising:
converting each analog signal received by the corresponding one of the plurality of first antenna elements to a first digital signal for each of the plurality of first antenna elements;
applying a first digital phase to each of the corresponding first digital signals to generate a first digital phase-shifted signal for each of the plurality of first antenna elements, wherein coherently combining the signal received by the plurality of first antenna elements comprises coherently combining the first digital phase-shifted signals to generate the first combined signal;
converting each analog signal received by the corresponding one of the plurality of second antenna elements to a second digital signal for each of the plurality of second antenna elements; and
applying a second digital phase to each of the corresponding second digital signals to generate a second digital phase-shifted signal for each of the plurality of second antenna elements, wherein the coherently combining the signal received by the plurality of second antenna elements comprises coherently combining the second digital phase-shifted signals to generate the second combined signal.

11. The method of claim 7, further comprising:
applying a first analog phase to the signal received by each corresponding one of the plurality of first antenna elements to generate a first phase-shifted signal for each of the plurality of first antenna elements, wherein coherently combining the signal received by the plurality of first antenna elements comprises coherently combining the first phase-shifted signals to generate the first combined signal;
analog-to-digital converting the first combined signal to a digital first combined signal;
applying a second analog phase to the signal received by each corresponding one of the plurality of second antenna elements to generate a second phase-shifted signal for each of the plurality of second antenna elements, where the coherently combining the signal received by the plurality of second antenna elements comprises coherently combining the second phase-shifted signals to generate the second combined signal; and
analog-to-digital converting the second combined signal to a digital second combined signal;
wherein applying channel equalization to the first and second combined signals comprises applying channel equalization to the digital first and second combined signals responsive to the known reference signal; and
wherein coherently combining the channel equalized first and second combined signals comprises coherently combining the channel equalized digital first and second combined signals to generate the combined output signal.

12. A wireless device, comprising:
an Advanced Antenna System (AAS) comprising a first Phased Antenna Array Module (PAAM), a second PAAM, a system combiner, a processing circuit, and a wireless transceiver,
wherein the first PAAM is allocated to a first portion of a spatial coverage area of the AAS and comprises:
a plurality of first antenna elements arranged according to a first geometry; and
a first combiner configured to coherently combine a first signal received by the plurality of first antenna elements responsive to the first geometry to generate a first combined signal;
wherein the second PAAM is allocated to a second portion of the spatial coverage area that is non-overlapping with the first portion of the spatial coverage area, the second PAAM comprising:
a plurality of second antenna elements arranged according to a second geometry; and
a second combiner configured to coherently combine a second signal received by the plurality of second antenna elements responsive to the second geometry to generate a second combined signal;

wherein the system combiner is configured to:
apply channel equalization to each of the first and second combined signals responsive to a known reference signal received by the AAS; and
coherently combine the channel equalized first and second combined signals using Maximum Ratio Combining (MRC) when an incoming beam direction is from the spatial coverage area of the AAS but outside the first and second portions of the spatial coverage area to generate a combined output signal, wherein the processing circuit is configured to output data for use by the wireless transceiver responsive to the combined output signal, and wherein an incoming beam direction for the first and second PAAMs is the same.

13. The wireless device of claim 12, wherein:
a third portion of the spatial coverage area includes a gap between the first and second portions of the spatial coverage area and a fraction of the first and second portions abutting each side of the gap; and
the system combiner is configured to coherently combine the channel equalized first and second combined signals using the MRC when an incoming beam direction is from the third portion of the spatial coverage area of the AAS.

14. The wireless device of claim 12, wherein
the system combiner is configured to coherently combine the channel equalized first and second combined signals using the MRC when an incoming beam direction is from a portion of the spatial coverage area where the first and second fourth-portions of the spatial coverage area at least partially overlap.

15. The wireless device of claim 12, wherein the system combiner comprises:
a first channel equalizer configured to apply channel equalization to the first combined signal responsive to the known reference signal received by the first PAAM to generate a first equalized signal;
a second channel equalizer configured to apply channel equalization to the second combined signal responsive to the known reference signal received by the second PAAM to generate a second equalized signal; and
an MRC combiner circuit configured to coherently combine the first and second equalized signals using the MRC to generate the combined output signal.

16. The wireless device of claim 12, wherein:
the first PAAM further comprises:
a plurality of first analog-to-digital converters, each configured to convert the signal received by the corresponding one of the plurality of first antenna elements to a first digital signal for each of the plurality of first antenna elements; and
a plurality of first digital phase-shifting circuits, each operatively connected to a corresponding one of the plurality of first analog-to-digital converters and configured to apply a first digital phase to the corresponding first digital signal to generate a first digital phase-shifted signal for each of the plurality of first antenna elements, wherein the first combiner coherently combines the signal received by the plurality of first antenna elements by coherently combining the first digital phase-shifted signals to generate the first combined signal; and
the second PAAM further comprises:
a plurality of second analog-to-digital converters, each configured to convert the signal received by the corresponding one of the plurality of second antenna elements to a second digital signal for each of the plurality of second antenna elements; and
a plurality of second digital phase-shifting circuits, each operatively connected to a corresponding one of the plurality of second analog-to-digital converters and configured to apply a second digital phase to the corresponding second digital signal to generate a second digital phase-shifted signal for each of the plurality of second antenna elements, wherein the second combiner coherently combines the signal received by the plurality of second antenna elements by coherently combining the second digital phase-shifted signals to generate the second combined signal.

17. The wireless device of claim 12, wherein:
the first PAAM further comprises:
a plurality of first analog phase-shifting circuits, each configured to apply a first analog phase to the signal received by the corresponding one of the plurality of first antenna elements to generate a first phase-shifted signal for each of the plurality of first antenna elements, where the first combiner coherently combines the signal received by the plurality of first antenna elements by coherently combining the first phase-shifted signals to generate the first combined signal; and
a first analog-to-digital converter configured to convert the first combined signal to a digital first combined signal;
the second PAAM further comprises:
a plurality of second analog phase-shifting circuits, each configured to apply a second analog phase to the signal received by the corresponding one of the plurality of second antenna elements to generate a second phase-shifted signal for each of the plurality of second antenna elements, wherein the second combiner coherently combines the signal received by the plurality of second antenna elements by coherently combining the second phase-shifted signals to generate the second combined signal; and
a second analog-to-digital converter configured to convert the second combined signal to a digital second combined signal; and
the system combiner is configured to apply the channel equalization to the digital first and second combined signals responsive to the known reference signal and to coherently combine the channel equalized digital first and second combined signals to generate the combined output signal.

18. The wireless device of claim 12, wherein the wireless device is a base station configured to support a wireless communication network.

19. The wireless device of claim 12, wherein the wireless device is a User Equipment configured to access a wireless communication network.

* * * * *